C. B. RAGER.
NUT-LOCK.
No. 170,015.  Patented Nov. 16, 1875.
Fig. 1
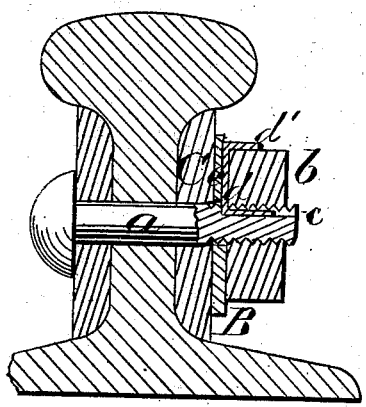
Fig. 2
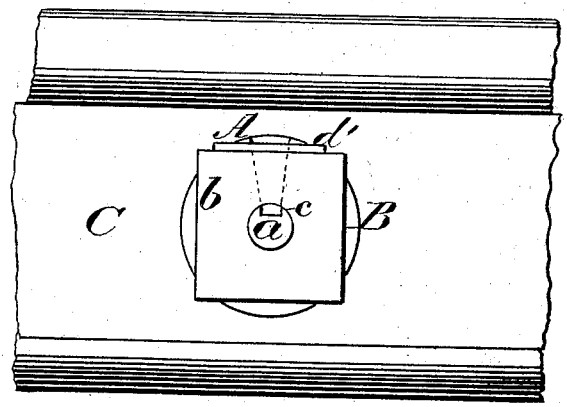
Fig. 3
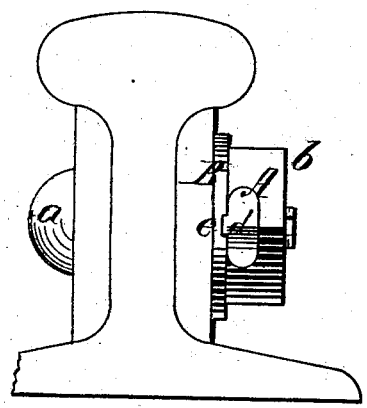
Fig. 4
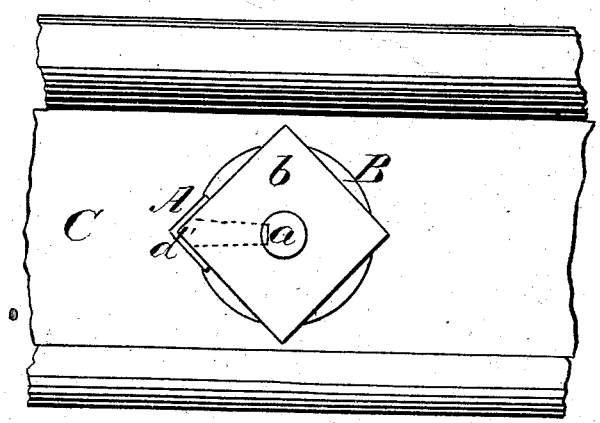
Fig. 5
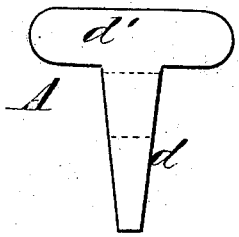
Fig. 6
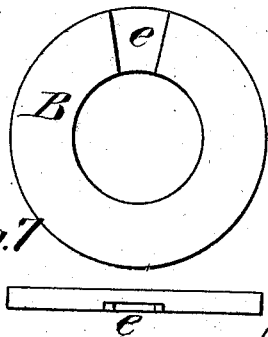
Fig. 7
WITNESSES
E. H. Bates
George C. Upham
INVENTOR
Christian B. Rager,
Chipman Hosmer & Co
ATTORNEYS
N. PETERS, PHOTO-LITHOGRAPHER, WASHINGTON, D. C.

UNITED STATES PATENT OFFICE.

CHRISTIAN B. RAGER, OF NORTH MANCHESTER, INDIANA.

IMPROVEMENT IN NUT-LOCKS.

Specification forming part of Letters Patent No. 170,015, dated November 16, 1875; application filed August 21, 1875.

*To all whom it may concern:*

Be it known that I, CHRISTIAN B. RAGER, of North Manchester, in the county of Wabash and State of Indiana, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a transverse section of my nut-lock, and Fig. 2 is a side view thereof. Fig. 3 is an end view, and Fig. 4 a plan view, of the same. Figs. 5, 6, and 7 are detail views thereof.

This invention has relation to means for locking nuts on bolts; and the nature of my invention consists in a T-shaped piece of flexible metal, in combination with a radially-grooved washer and a longitudinally-grooved bolt, which grooves are designed to receive the tongue of the locking-piece, so that when the nut is set up it will hold this piece securely, and when the head of the latter is turned up it will prevent the nut from turning, as will be hereinafter explained.

The annexed drawing represents my nut-locking device applied to the bolt $a$ and nut $b$, used for securing together railroad-rails and fish-plates at the joints of the rails. The bolt $a$ has a groove, $c$, in it which intersects the treads on this bolt, and which is designed to receive a portion of the tongue $d$ of the locking-piece A. B designates a washer, which is between the nut $b$ and the fish-plate C, and which is constructed with a radial groove, $e$, in it for receiving a portion of the locking-piece A, as shown in Fig. 1. The T-shaped piece A is made of sheet metal, and when its tongue $d$ is adjusted in the two grooves $c\ e$ it will be firmly held by the nut $b$, when this nut is screwed home. The nut is then safely held by turning up the head $d'$ of the piece A.

The head $d'$ may be set up against the flat side of the nut, or it may be bent about the angle thereof.

I am aware that a sheet-metal locking-plate having a tongue projecting within a longitudinal groove in the bolt, and bent up at the side of the nut, is not new; but

What I claim as new, and desire to secure by Letters Patent, is—

The T-shaped piece A, having the tongue $d$ and head $d'$, and the washer B, having the radial groove $e$, arranged between the nut $b$ and fish-plate C, in combination with the bolt $a$, having the groove $c$ and the nut $b$, all constructed as set forth.

In testimony that I claim the above I have hereunto subscribed my name in the presence of two witnesses.

CHRISTIAN B. RAGER.

Witnesses:
VARNUM J. CARD,
CHAS. S. WHARTON.